US012697834B2

(12) United States Patent
Triggs-Ramm et al.

(10) Patent No.: US 12,697,834 B2
(45) Date of Patent: Aug. 4, 2026

(54) METHOD OF APPLYING A PATTERN, AND SECURITY DEVICE FOR AN ARTICLE

(71) Applicant: E INK CORPORATION, Billerica, MA (US)

(72) Inventors: Graham Triggs-Ramm, Aberdeenshire (GB); Peiman Hosseini, Greater London (GB)

(73) Assignee: E Ink Corporation, Billerica, MA (US)

( * ) Notice: Subject to any disclaimer, the term of this patent is extended or adjusted under 35 U.S.C. 154(b) by 421 days.

(21) Appl. No.: 17/928,031

(22) PCT Filed: May 26, 2021

(86) PCT No.: PCT/GB2021/051278
§ 371 (c)(1),
(2) Date: Nov. 28, 2022

(87) PCT Pub. No.: WO2021/245373
PCT Pub. Date: Dec. 9, 2021

(65) Prior Publication Data
US 2023/0226842 A1 Jul. 20, 2023

(30) Foreign Application Priority Data
Jun. 1, 2020 (GB) ...................................... 2008165

(51) Int. Cl.
*B42D 25/425* (2014.01)
*B42D 25/324* (2014.01)
(Continued)

(52) U.S. Cl.
CPC ......... *B42D 25/425* (2014.10); *B42D 25/324* (2014.10); *B42D 25/36* (2014.10);
(Continued)

(58) Field of Classification Search
CPC .... B42D 25/425; B42D 25/324; B42D 25/36; B42D 25/455; B42D 25/46; B42D 25/29;
(Continued)

(56) References Cited

U.S. PATENT DOCUMENTS 7,336,422 B2 2/2008 Dunn et al.
9,323,044 B2 4/2016 Feenstra et al.
(Continued)

FOREIGN PATENT DOCUMENTS

EP 2200840 A1 6/2010
EP 3608369 A1 2/2020
(Continued)

OTHER PUBLICATIONS

European Patent Office, "Extended European Search Report", EP. Appl. No. 23203552.7, Jan. 8, 2024.
(Continued)

*Primary Examiner* — Megha M Gaitonde
(74) *Attorney, Agent, or Firm* — Brian D. Bean

(57) ABSTRACT

Methods of applying a pattern and security devices are disclosed. In one arrangement, a receiving member (10) having a layered structure (12) is provided. The layered structure (12) comprises a layer of phase change material (PCM, 2). The phase change material (PCM, 2) is thermally switchable between a plurality of stable states having different refractive indices relative to each other. An embossing member (5) is stamped into the receiving member (10). The embossing member (5) heats a selected portion of the layer CA of phase change material (PCM, 2) via contact with the receiving member (10) during the stamping. The heating thermally switches N phase change material (PCM, 2) in the selected portion and thereby applies a pattern of different refractive indices to the layer of phase change material (PCM, 2).

4 Claims, 3 Drawing Sheets

(51) Int. Cl.

| | |
|---|---|
| ***B42D 25/36*** | (2014.01) |
| ***B42D 25/455*** | (2014.01) |
| ***B42D 25/46*** | (2014.01) |
| *B42D 25/29* | (2014.01) |

(52) U.S. Cl.
CPC .......... *B42D 25/455* (2014.10); *B42D 25/46* (2014.10); *B42D 25/29* (2014.10)

(58) Field of Classification Search
CPC .......... B42D 25/346; Y10T 428/24479; Y10T 428/24521; Y10T 428/24529; Y10T 428/24612; Y10T 428/24942; Y10T 428/2495
USPC ........ 428/141, 156, 161, 162, 172, 212, 213
See application file for complete search history.

(56) References Cited

U.S. PATENT DOCUMENTS

| | | | |
|---|---|---|---|
| 9,823,538 | B2 | 11/2017 | Bhaskaran et al. |
| 9,987,873 | B2 | 6/2018 | Petiton et al. |
| 10,068,606 | B2 | 9/2018 | Bhaskaran et al. |
| 10,317,707 | B2 | 6/2019 | Hosseini et al. |
| 10,518,568 | B2 | 12/2019 | Staub et al. |
| 10,718,987 | B2 | 7/2020 | Hosseini et al. |
| 10,884,267 | B2 | 1/2021 | Bhaskaran et al. |
| 10,884,314 | B2 | 1/2021 | Broughton et al. |
| 11,112,672 | B2 | 9/2021 | Hosseini et al. |
| 11,215,852 | B2 | 1/2022 | Hosseini et al. |
| 11,392,088 | B2 | 7/2022 | Rottenberg et al. |
| 11,520,172 | B2 | 12/2022 | Bhaskaran et al. |
| 2016/0334647 | A1 | 11/2016 | Lin et al. |
| 2019/0064555 | A1* | 2/2019 | Hosseini ............... G02F 1/0147 |
| 2020/0124881 | A1 | 4/2020 | Hosseini |
| 2020/0202804 | A1 | 6/2020 | Garcia et al. |
| 2020/0209059 | A1 | 7/2020 | Sarwat et al. |

FOREIGN PATENT DOCUMENTS

| | | | |
|---|---|---|---|
| GB | 2565561 | A | 2/2019 |
| JP | 3050517 | U | 7/1998 |
| JP | 2002071953 | A | 3/2002 |
| JP | 2007095274 | A | 4/2007 |
| WO | 2009033601 | A1 | 3/2009 |
| WO | 2012076171 | A1 | 6/2012 |
| WO | 2015097469 | A2 | 7/2015 |

OTHER PUBLICATIONS

Hosseini, Peiman et al., “An optoelectronic framework enabled by low-dimensional phase-change films”, Nature, vol. 511, No. 7508, pp. 206-211, (Jul. 9, 2014).
Kaino, Yuriko et al., “Laser-addressed full-color photo-quality rewritable sheets based on thermochromic systems with leuco dyes”, J Soc Inf Display, vol. 27, No. 5, pp. 295-303, (Apr. 11, 2019).
Talagrand, Clement et al., “Solid-state reflective displays (SRD®) for video-rate, full color, outdoor readable displays”, Journal of the Society for Information Display, vol. 26, No. 10, pp. 619-624 (Oct. 2018).
European Patent Office, “International Search Report and Written Opinion”, PCT/GB2021/051278, Sep. 24, 2021.

* cited by examiner

METHOD OF APPLYING A PATTERN, AND SECURITY DEVICE FOR AN ARTICLE

RELATED APPLICATIONS

This application is a U.S. national-stage application filed under 35 U.S.C. § 371 from PCT/GB2021/051278, filed May 26, 2021, which claims priority to GB 2008165.9, filed Jun. 1, 2020. All patents, patent applications, and publications disclosed herein are incorporated by reference in their entirety.

The invention relates to methods of applying patterns and is particularly applicable to use with security devices for incorporation into articles such as legal tender (e.g. banknotes).

The increased adoption of plastic banknotes for heavily traded currencies such as the Pound Sterling has created new opportunities for security products specifically designed for polymer substrates. Overt features are of particular interest given the general public role as a first line of defence against counterfeiters. Most security products available on the market are traditional OVD (optically variable device) based inks, or holographic and/or lenticular based micro- and/or nanostructures. Given their wide availability over many years, there is now a need for new forms of security features that are difficult to replicate or simulate. Such security features should ideally also be manufacturable at scale.

It is an object of the invention to provide a new way of applying patterns, particularly in the context of security devices.

According to an aspect of the invention, there is provided a method of applying a pattern, comprising: providing a receiving member having a layered structure, the layered structure comprising a layer of phase change material, the phase change material being thermally switchable between a plurality of stable states having different refractive indices relative to each other; and stamping an embossing member into the receiving member, wherein: the embossing member heats a selected portion of the layer of phase change material via contact with the receiving member during the stamping, the heating being such as to thermally switch phase change material in the selected portion and thereby apply a pattern of different refractive indices to the layer of phase change material.

This approach allows visually captivating (including metallic-looking) features to be formed that can be applied to both overt and covert security products. The layered structure including the layer of phase change material (PCM) can be switched precisely between different states, allowing accurately tuneable colours and controlled viewing angle variability. High contrast and high reflectivity can be achieved. The patterns can be applied efficiently and at scale and without requiring special inks or holographic technologies. The design of the layered structure and embossing member can be tuned to provide effects that are visible (via the human eye or an optical instrument) only at specific wavelengths of interrogation, which can be provided by a specifically selected checking laser or narrow band LED for example. This would enable robust methods for checking article authenticity and is difficult to mimic.

In an embodiment, the embossing member comprises a stamping surface having a pattern of protrusions, and the stamping causes the protrusions to form a corresponding pattern of indentations in the receiving member. Thus, the stamping process imparts two different types of pattern to the receiving member. The heating associated with the stamping changes visual characteristics in localized regions by switching the PCM into a different refractive index state in those regions (e.g. by crystallizing the PCM in those regions and leaving the PCM in an amorphous state in other regions). At the same time, the pattern of indentations modifies the directions of reflections from the surface and provides enhanced viewing angle variability. A retroreflective behaviour can be achieved in which tilting the receiving member to particular angles can lead to two competing reflections from different surfaces, with differences in colour and brightness based on the light to observer viewing angle.

In an embodiment, the pattern of indentations is spatially registered with the pattern of different refractive indices in the layer of PCM. The spatial registration can be achieved efficiently and accurately due to the nature of the stamping process, which applies both types of pattern (via PCM switching and indentations) simultaneously and using the same physical components (e.g. heated protrusions). Achieving similar results with two traditional, non-switchable, separate OVD inks requires a level of feature registration that is currently beyond the capability of state-of-the art printing techniques (e.g. <few microns). At the same time, the approach of this embodiment is still hard to replicate because it requires at least the following.

i. A deep understanding of the materials involved. Applicable PCMs have complex compositions, typically comprising three-element chalcogenide glasses with tightly defined relative compositions of the elements.
ii. Access to reliable supplier of PCM materials targets. The chemistry involved makes target manufacturing a non-trivial task with only a handful of suppliers able to manufacture high quality targets.
iii. A full understanding of the stack structure and design principle. Specialized software and engineering skills are required in order to understand how to design these films.

In an embodiment, at least a portion of a recessed region of the stamping surface outside of the protrusions in the stamping surface does not contact the receiving member during the stamping. This means that the stamping surface can be heated uniformly while still allowing a spatially non-uniform heating to be applied to the PCM (via the protrusions).

A wide variety of optical effects can be achieved by varying the way the embossing member is stamped into the receiving member (e.g. stamping the embossing member into different sides of the receiving member or into both sides of the receiving member), varying the form of the stamping member (e.g. providing different patterns of protrusions, such as patterns having individual protrusion elements with symmetric or asymmetric cross-sections), repeating the stamping process multiple times in different positions, from different sides and/or using different stamping members, and/or providing further features in indentations formed by the stamping, such as transparent members that give a retroreflective effect.

In an embodiment, a stamping surface of the embossing member has a non-uniform temperature distribution during the stamping, the non-uniform temperature distribution at least partly defining the selected portion of the layer of phase change material that is thermally switched during the stamping. This approach is more complicated to implement but allows patterns of different refractive indices to be defined which are different (e.g. more complex) than the pattern of indentations defined by the protrusions.

In some embodiments, the method is used to form all or part of a security device for an article. The article may comprise an article of legal tender such as a banknote, or any other article where a security device would be useful, such as other public documents, documents of high value, and/or pharmaceutic products.

According to an alternative aspect, there is provided a security device for an article, the device comprising: a layered structure comprising a layer of phase change material, the phase change material being thermally switchable between a plurality of stable states having different refractive indices relative to each other, wherein: the layer of phase change material comprises a pattern of different refractive indices at least partly defined by a selected portion of the phase change material in the layer being in one of the stable states and a remaining portion of the phase change material being in one or more other stable states; and the layered structure comprises a pattern of indentations in a surface of the layered structure, the pattern of indentations being spatially registered with the pattern of different refractive indices in the layer of phase change material.

The invention will now be further described, by way of example, with reference to the accompanying drawings, in which.

Throughout this specification, the terms "optical" and "light" are used, because they are the usual terms in the art relating to electromagnetic radiation, but it is understood that in the context of the present specification they are not limited to visible light. It is envisaged that the invention can also be used with wavelengths outside of the visible spectrum, such as with infrared and ultraviolet light.

Figure 1:
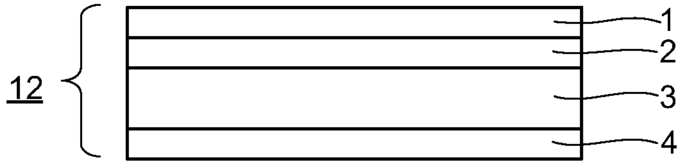
FIG. 1 is a schematic side sectional view of a layered structure into which a pattern may be applied by methods of the disclosure.

As exemplified in FIGS. 1-5, the present disclosure provides methods of applying a pattern to a receiving member 10. The receiving member 10 comprises a layered structure 12, as depicted in FIG. 1. In some embodiments, the layered structure 12 comprises a thin film stack formed on a substrate 8. The substrate 8 may comprise a polymer material.

At least one of the layers of the layered structure 12 is a layer of PCM 2. The PCM is thermally switchable between a plurality of states having different refractive indices relative to each other. The different refractive indices may include different imaginary components and therefore different absorbances. The different refractive indices may cause the PCM 2 to have different colours and/or provide different optical effects in the different states.

All layers in the layered structure 12 are typically solid-state and configured so that their thicknesses as well as refractive index and absorption properties combine so that the different states of the PCM result in different, visibly and/or measurably distinct, reflection spectra. Optical devices of this type are described in Nature 511, 206-211 (10 Jul. 2014), WO2015/097468A1, WO2015/097469A1, EP3203309A1 and WO2017/064509A1.

In an embodiment the PCM comprises, consists essentially of, or consists of, one or more of the following: an oxide of vanadium (which may also be referred to as VOx); an oxide of niobium (which may also be referred to as NbOx); an alloy or compound comprising Ge, Sb, and Te; an alloy or compound comprising Ge and Te; an alloy or compound comprising Ge and Sb; an alloy or compound comprising Ga and Sb; an alloy or compound comprising Ag, In, Sb, and Te; an alloy or compound comprising In and Sb; an alloy or compound comprising In, Sb, and Te; an alloy or compound comprising In and Se; an alloy or compound comprising Sb and Te; an alloy or compound comprising Te, Ge, Sb, and S; an alloy or compound comprising Ag, Sb, and Se; an alloy or compound comprising Sb and Se; an alloy or compound comprising Ge, Sb, Mn, and Sn; an alloy or compound comprising Ag, Sb, and Te; an alloy or compound comprising Au, Sb, and Te; and an alloy or compound comprising Al and Sb (including the following compounds/alloys in any stable stoichiometry: GeSbTe, VOx, NbOx, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb). Preferably, the PCM comprises one of $Ge_2Sb_2Te_5$ and $Ag_3In_4Sb_{76}Te_{17}$. It is also understood that various stoichiometric forms of these materials are possible: for example $Ge_xSb_yTe_z$; and another suitable material is $Ag_3In_4Sb_{76}Te_{17}$ (also known as AIST). Furthermore, any of the above materials can comprise one or more dopants, such as C or N. Other materials may be used.

PCMs are known that undergo a drastic change in both the real and imaginary refractive index when switched between amorphous and crystalline phases. The PCM is stable in each state. The switching can be achieved by any form of heating and can in principle be performed an effectively limitless number of times and with great rapidity. In the embodiments described below the switching is achieved by transferring heat from an embossing member 5 to the PCM by contact between the embossing member 5 and the receiving member 10.

Although some embodiments described herein mention that the PCM is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

In an embodiment, the PCM comprises $Ge_2Sb_2Te_5$ (GST) in a layer less than 200 nm thick. In another embodiment, the PCM comprises GeTe (not necessarily in an alloy of equal proportions) in a layer less than 100 nm thick.

Referring again to FIG. 1, in some embodiments the layered structure 12 comprises a reflective layer 4. The reflective layer 4 may be made highly reflective or only partially reflective. The reflective layer 4 may be omitted. In an embodiment, the reflective layer 4 comprises reflective material such as a metal. Metals are known to provide good reflectivity (when sufficiently thick) and also have high thermal and electrical conductivities. The reflective layer 4 may have a reflectance of 50% or more, optionally 90% or more, optionally 99% or more, with respect to visible light, infrared light, and/or ultraviolet light. The reflective layer 4 may comprise a thin metal film, composed for example of Au, Ag, Al, or Pt. If this layer is to be partially reflective then a thickness in the range of 5 to 15 nm might be selected, otherwise the layer is made thicker, such as 100 nm, to be substantially totally reflective.

In some embodiments, the layered structure 12 further comprises a spacer layer 3. The spacer layer 3 is between the PCM 2 and the reflective layer 4.

In some embodiments, the layered structure 12 further comprises a capping layer 1. The PCM 2 is between the capping layer 1 and the reflective layer 4. The upper surface of the capping layer 1 may represent a viewing surface of the receiving member, with the reflective layer 4 acting as a back-reflector. Light enters and leaves the receiving member 10 through the capping layer 1 as the viewing surface. Interference effects dependent on the refractive index of the PCM 2 and the thickness of the spacer layer 3 cause the reflectivity to vary significantly as a function of wavelength. The spacer layer 3 and the capping layer 1 are both optically transmissive and ideally as transparent as possible.

Each of the capping layer 1 and spacer layer 3 may consist of a single layer or comprise multiple layers having different refractive indices relative to each other (i.e. where the capping layer 1 or spacer layer 3 consists of multiple layers at least two of those layers have different refractive indices relative to each other). The thickness and refractive index of the material or materials forming the capping layer 1 and/or spacer layer 3 are chosen to create a desired spectral response (via interference and/or absorption). Materials which may be used to form the capping layer 1 and/or spacer layer 3 may include (but are not limited to) ZnO, $TiO_2$, $SiO_2$, $Si_3N_4$, TaO, ITO, and ZnS—$SiO_2$.

Any or all of the layers in the layered structure 12 may be formed by sputtering, which can be performed at a relatively low temperature of 100 degrees C. The layers can also be patterned using conventional techniques known from lithography, or other techniques e.g. from printing.

In a particular embodiment, the layer of PCM 2 comprises GST, is less than 100 nm thick, and preferably less than 10 nm thick, such as 6 or 7 nm thick. The spacer layer 3 is grown to have a thickness typically in the range from 10 nm to 250 nm, depending on the colour and optical properties required. The capping layer 1 is, for example, 20 nm thick.

Figure 2:
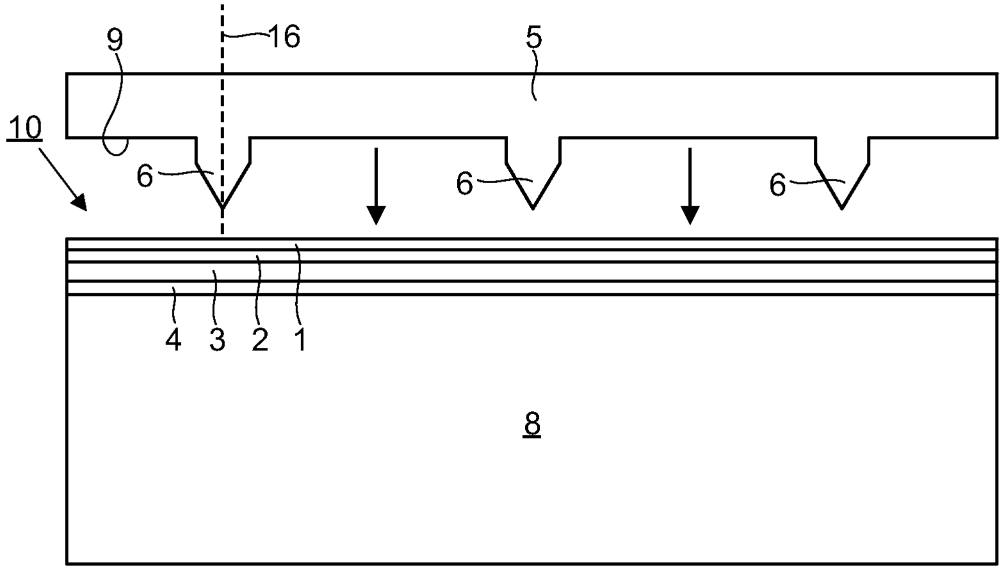
FIGS. 2-5 are schematic side sectional views depicted stamping of an embossing member into a receiving member comprising the layered structure of FIG. 1 to apply registered patterns of different refractive indices and indentations.
Figure 3:
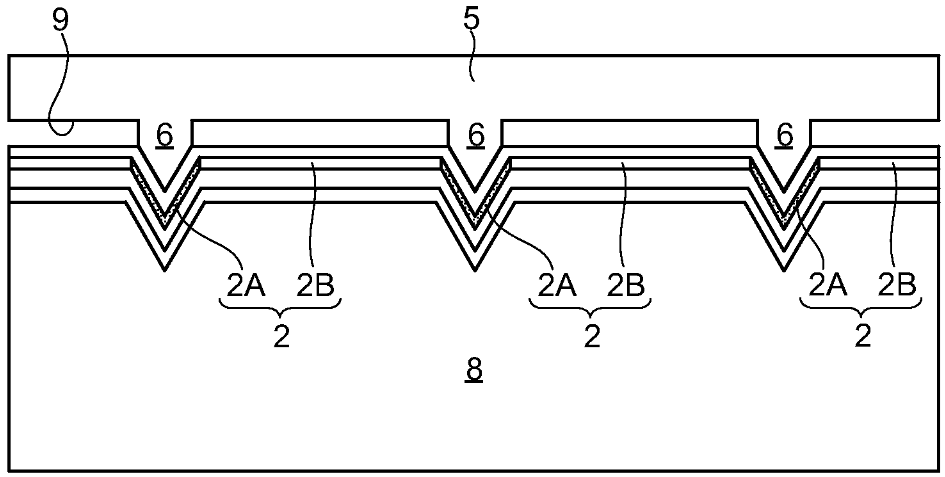
Figure 4:
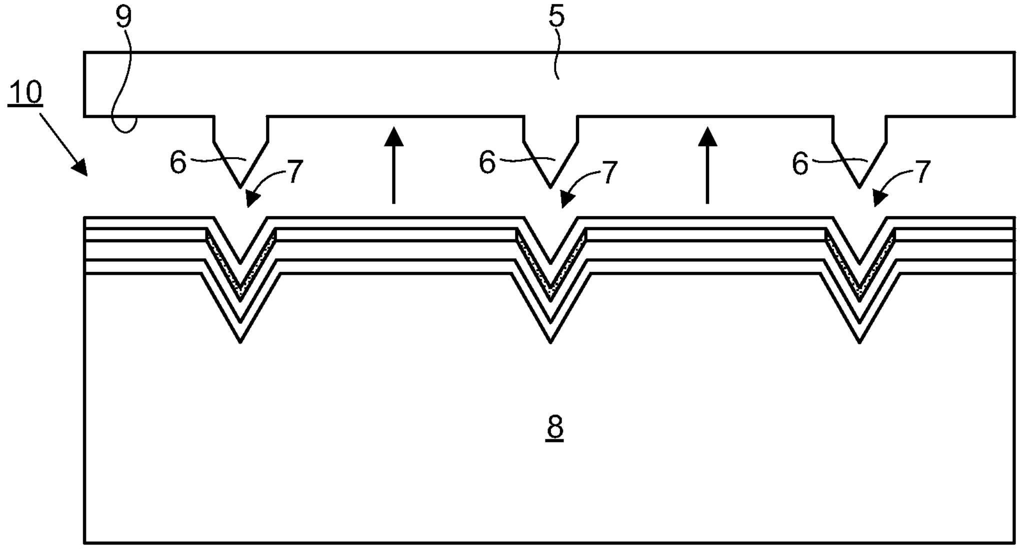
Figure 5:
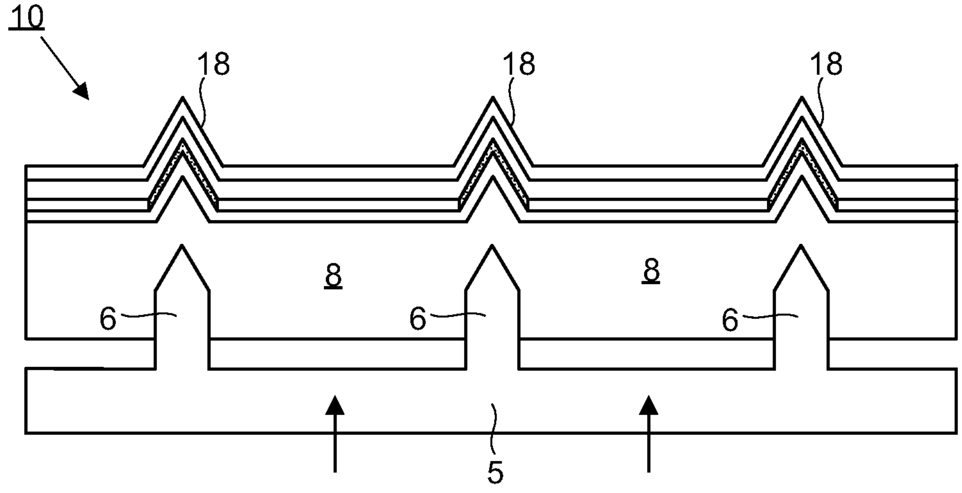

As depicted in FIGS. 2-5, the method of forming a pattern comprises stamping an embossing member 5 into the receiving member 10. FIG. 2 shows a stage of the stamping process when the embossing member 5 is moving downwards towards the receiving member 10 but has not yet contacted the receiving member 10. FIG. 3 shows a later stage of the stamping process when the embossing member 5 is in contact with the receiving member 10. FIG. 4 shows a final stage of the stamping process when the embossing member 5 is moving away from the receiving member 10. FIG. 5 depicts a stage of an alternative stamping process equivalent to FIG. 3 except that the stamping is performed from an opposite side of the receiving member 10.

The embossing member 5 heats a selected portion 2A of the layer of PCM 2 via contact between the embossing member 5 and the receiving member 10 during the stamping, as depicted in FIG. 3. The embossing member 5 is thus hotter than the PCM 2 before the stamping takes place. The heating thermally switches PCM in the selected portion 2A. A remaining portion (portion 2B) of the layer of PCM 2 is left in the original refractive index state. The combination of portions 2A and 2B (which have different refractive indices relative to each other) defines a pattern of different refractive indices that has been applied by the stamping to the layer of PCM 2.

In an embodiment, all of the layer of PCM 2 is provided in the same initial state prior to the stamping, as depicted in FIG. 2. The layer of PCM 2 is thus unpatterned at this stage. In an embodiment, the initial state is an amorphous state. In an embodiment, the stamping of the embossing member 5 (FIG. 3) causes the portion 2A to change state (e.g. to a crystalline state) while the rest of the layer of PCM 2 remains in the initial state (e.g. amorphous).

In an embodiment, the embossing member 5 comprises a stamping surface (the lower surface of the embossing member 5 in FIGS. 2-4 and the upper surface of the embossing member 5 in FIG. 5). The stamping surface has a plurality of protrusions 6. A wide range of shapes may be used for the protrusions 6 to achieve a corresponding range of optical effects. However, it may generally by preferable to configure the protrusions 6 so that they can penetrate into the receiving member 10 without excessive force. The protrusions 6 may therefore be tapered (e.g. comprising tapered elements such as tapered points and/or ridges).

Figure 9:
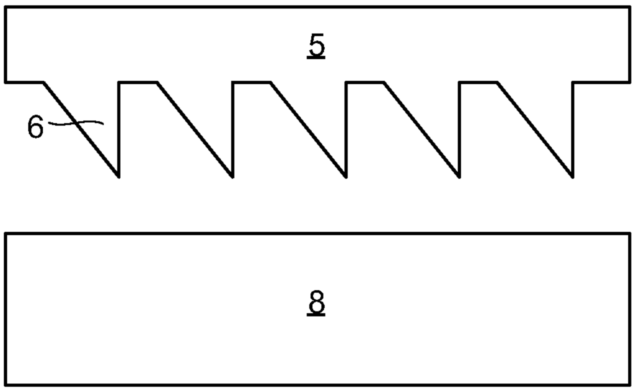
FIG. 9 is a side sectional view depicting an example embossing member in which a stamping surface has a plurality of asymmetric protrusion elements.

In some embodiments, the protrusions 6 comprise a plurality of identical protrusion elements (as shown in the examples). In FIGS. 2-5, the protrusions 6 are shown with three such protrusion elements. The protrusion elements may have mirror symmetric cross-sections when viewed in a direction perpendicular to the direction of stamping (e.g. viewed in a direction perpendicular to the plane of the page in the figures). An exemplary line of mirror symmetry is labelled 16 for one of the protrusion elements in FIG. 2. This approach may allow the same visual pattern to be observed from multiple directions in the resulting receiving member 10. Alternatively, the protrusion elements may have a cross-section when viewed in the direction perpendicular to the direction of stamping that is asymmetric. An example of such an arrangement is depicted in FIG. 9. This approach may be used to provide a special visual pattern observable only for a narrow range of selected orientations of an article relative to the observer, which may be useful for security applications.

Figure 6:
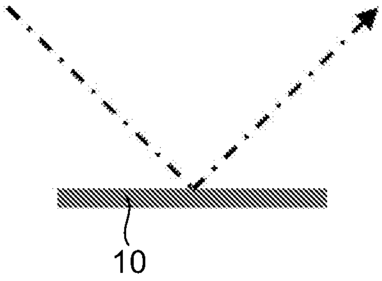
FIG. 6 is a side view schematically depicting reflection from an unindented portion of the receiving member of FIG. 4.
Figure 7:
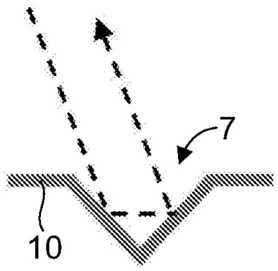
FIG. 7 is a side view schematically depicting reflection from an indentation in the receiving member of FIG. 4.
Figure 8:
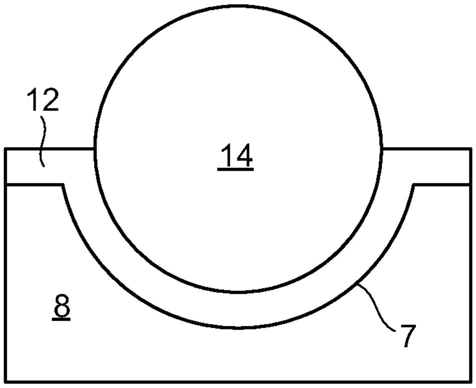
FIG. 8 is a side sectional view schematically depicting a transparent member in an indentation in the receiving member for providing retroreflection functionality.

The stamping causes the protrusions 6 to form a corresponding pattern of indentations 7 in the receiving member 10 (labelled in FIG. 4). The indentations 7 modify reflection of light from the receiving member 10, providing increased freedom for creating optical effects and/or variation of optical effects and/or variation of observable patterns as a function of viewing angle. FIGS. 6 and 7 schematically show how an indentation 7 of the type formed in the method depicted in FIGS. 2-4 can modify reflection to provide a retroreflective behaviour (FIG. 7), where light incident from certain angles is reflected back towards a source to a greater extent than would have been the case had the reflective surface been simply planar (FIG. 6). The retroreflective behaviour can be achieved relative to variation of viewing angle about a single axis (2D retroreflectivity), for example with an elongate ridge-like indentation, or relative to variation of viewing angle about multiple axes (3D retroreflectivity), for example with an indentation shaped like the interior corner of a cuboid. In some embodiments, as exemplified in FIG. 8, a transparent member 14 is provided in one or more of the indentations 7 formed by the stamping. The transparent member 14 may be configured to provide a retroreflective effect. The transparent member 14 may, for example, be spherical and/or have a refractive index greater than 1. In some embodiments, the transparent member 14 is applied in a separate process after the stamping has been performed. In other embodiments, the transparent member 14 is applied at the same time as the stamping. For example, the embossing member 5 may be provided with a pattern of protrusions 6 that includes one or more of the transparent members 14 (e.g. located at respective tips of individual protrusion elements in the pattern of protrusions). The stamping process in this case presses the transparent members 14 into the receiving member 10 during the stamping. A connection between the transparent members 14 and the embossing member 5 is arranged to be weaker than a connection between the transparent members 14 and the receiving member 10, such that the transparent members 14 are left behind in the receiving member 10 when the embossing member 5 is drawn back.

The pattern of indentations 7 is spatially registered with the pattern of different refractive indices in the layer of PCM 2. In the example shown, the spatial registration consists of localized regions of the portion 2A of switched PCM 2 being located at the same positions as the indentations (i.e. where the hot protrusions penetrated into the receiving member 10). The pattern of indentations 7 may thus be aligned with the pattern of different refractive indices (defined by the portion 2A of switched PCM 2). The pattern of indentations 7 may also be substantially identical to the pattern of different refractive indices. This spatial registration and/or identicality of patterns can be achieved efficiently relative to alternative approaches for forming different types of pattern because in the present case the two types of pattern are both formed by contact between the same embossing member 5 and the receiving member 10.

In an embodiment, at least a portion of a recessed region 9 outside of the protrusions 6 in the stamping surface does not contact the receiving member 10 during the stamping (see FIGS. 3 and 5). This means that the stamping surface can be heated uniformly while still allowing a spatially non-uniform heating to be applied to the PCM 2 (via the protrusions 6).

In other embodiments, the stamping surface of the embossing member 5 has a non-uniform temperature distribution during the stamping. The non-uniform temperature distribution may in this case at least partly define the selected portion of the layer of PCM 2 that is thermally switched during the stamping. The non-uniform temperature distribution may be provided for example via a plurality of localized heating elements. By addressing different combinations of the heating elements and/or varying the powers output by them it is possible to define different spatial and/or temporal heating profiles, thereby allow patterns of different refractive indices to be defined which are different (e.g. more complex) than the pattern of indentations 7 defined by the protrusions 6. In some embodiments the embossing member 5 may be configured to allow individual control of the temperatures of different parts of the pattern of protrusions 6 (e.g. of different individual protrusions).

The stamping of the embossing member 5 into the receiving member 10 can be performed from either or both sides of the receiving member 10 (at different times or at the same time).

In some embodiments, as described in detail below, the layered structure 12 comprises a reflective layer 4 beneath the layer of PCM 2 and the stamping of the embossing member 5 into the receiving member 10 is performed at least once from the side of the PCM 2 opposite to the reflective layer 4 (i.e. from above, as shown in the arrangements of FIGS. 2-4). Alternatively or additionally, as exemplified in FIG. 5, in some embodiments the stamping of the embossing member 5 into the receiving member 10 is performed at least once from the same side of the PCM 2 as the reflective layer 4 (i.e. from below in the orientation of the figures). In this case, the stamping of the embossing member 5 into the receiving member 10 is such as to cause a modification of a surface topography on a side of the receiving member 10 opposite to the stamping (e.g. to form raised regions 18 in spatial registration with the protrusions 6 of the embossing member 5, as shown in FIG. 5).

In some embodiments, the stamping of the embossing member 5 into the receiving member 10 is performed multiple times. At least a subset of the stampings may be performed with different embossing members 5 (e.g. embossing members 5 having stamping surfaces with different patterns of protrusions). The using of multiple stamping (with or without different embossing members 5) may be done to provide complex optical effects and/or to adjust a visual effect at different times (e.g. to modify a security device to indicate a change in status, such as an upgrade or imminent expiry).

The receiving member 10 may form all or part of a security device for an article. The article may an article of legal tender (e.g. a banknote) or another article. The security device may thus comprise a layered structure 12. The layered structure 12 comprises a layer of PCM 2. The PCM 2 is thermally switchable between a plurality of stable states having different refractive indices relative to each other. The layer of PCM 2 comprises a pattern of different refractive indices at least partly defined by a selected portion 2A of the PCM 2 in the layer being in one of the stable states and a remaining portion 2B of the PCM 2 being in one or more other stable states. The layered structure 12 comprises a pattern of indentations 7 in a surface of the layered structure 12. The pattern of indentations 7 is spatially registered with the pattern of different refractive indices in the layer of PCM 2. The pattern of different refractive indices may be formed using any of the methods discussed above with reference to FIGS. 1-9. The pattern of indentations 7 may be formed using any of the methods discussed above with reference to FIGS. 1-9.

The invention claimed is:

1. A security device for an article, the device comprising:

a layered structure comprising a layer of phase change material, the phase change material being thermally switchable between a plurality of stable states having different refractive indices relative to each other, wherein:

the layer of phase change material comprises a pattern of different refractive indices at least partly defined by a selected portion of the phase change material in the layer being in one of the stable states and a remaining portion of the phase change material being in one or more other stable states; and the layered structure comprises a pattern of indentations in a surface of the layered structure, the pattern of indentations being spatially registered with the pattern of different refractive indices in the layer of phase change material, wherein the indentations provide a retroreflective behaviour by which incident light is reflected back towards a light source to a greater extent than would have been the case had the surface of the layered structure been simply planar.

2. The device of claim 1, wherein the pattern of indentations is aligned with the pattern of different refractive indices.

3. The device of claim 1, wherein the pattern of indentations is substantially identical to the pattern of different refractive indices.

4. The device of claim 1, wherein the layered structure comprises a polymer substrate.

* * * * *